Patented Aug. 11, 1925.

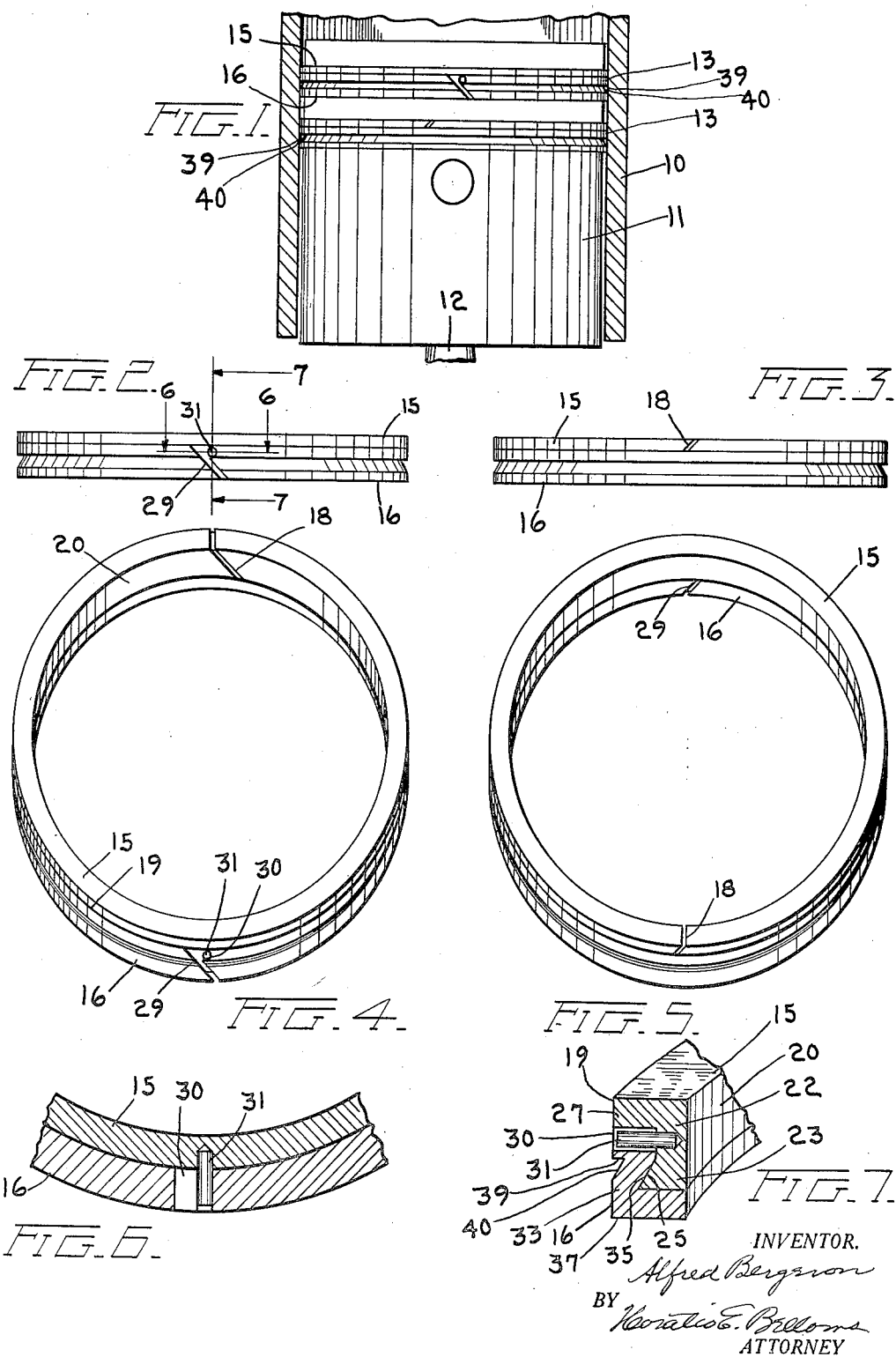
Aug. 11, 1925.
A. BERGERON
PISTON RING
Filed March 2, 1921
1,549,104

1,549,104

UNITED STATES PATENT OFFICE.

ALFRED BERGERON, OF ATTLEBORO, MASSACHUSETTS.

PISTON RING.

Application filed March 2, 1921. Serial No. 449,086.

*To all whom it may concern:*

Be it known that I, ALFRED BERGERON, a citizen of the United States, residing at Attleboro, in the county of Bristol and State of Massachusetts, have invented certain new and useful Improvements in Piston Rings, of which the following is a specification.

My invention relates to expanding piston rings having interlocking sections.

The essential objects of my invention are to facilitate the lubrication of the cylinder surface; to prevent the penetration of the ring by liquids, fluids, or gases; and to attain these ends in a simple and inexpensive structure.

To the above ends essentially my invention consists in such parts and in such combinations of parts as fall within the scope of the appended claim.

In the accompanying drawings which form a part of this specification

Figure 1 is a section of a cylinder showing in side elevation a piston carrying a plurality of piston rings embodying my invention, Figures 2 and 3, diametrically opposite side elevations respectively of my ring, Figures 4 and 5, obverse and reverse perspective views respectively of the same, and Figures 6 and 7, sections on lines 6—6 and 7—7 respectively of Figure 2.

Like reference characters indicate like parts throughout the views.

In the drawings 10 represents the cylinder, 11 the piston, and 12 the pitman of an engine. In grooves on the piston are mounted piston rings 13 embodying my invention.

In detail the piston ring 13 comprises two interlocking split ring members 15 and 16 disposed side by side. The ring 15 is split transversely and diagonally as at 18. Its outer face 19 slidably bears against the cylinder 10, and its inner face 20 engages the piston. Its inner portion includes a vertical wall 22 having a base portion 23 with an oblique or inclined annular shoulder 25. The upper portion of the wall 22 has a horizontal annular extension or flange 27. The ring member 16 is also provided with a diagonal slot 29 having a lateral enlargement or cavity 30 at its upper portion to receive the usual abutment pin 31 fast in the wall 22 of the member 15. The member 16 comprises a vertical wall 33 whose outer face coincides with the outer face 19 of its companion member, and is provided in its rear with an annular oblique recess 35 receiving the shoulder 25. The bottom of the wall 33 has a rearwardly directed extension or flange 37 whose rear face coincides with the face of the member 15.

It will be observed that the oblique face of the acute angled annular shoulder 25 forms a joint which, combined with the mutually overlapping flanges 27 and 37, forms an effective check against the passage of gas, fluid or liquid.

In the exterior or operating face of the wall 33 of the ring member 16 is an annular groove acute angular in cross section comprising a horizontal face 39 and an inclined face 40. This groove or channel is an important lubricating means. When the piston and its ring 13 moves in one direction the wall 39 in scraping the cylinder surface accumulates the oil in the cavity from which it is distributed by the inclined surface 40 by the return stroke of the piston.

I claim:—

A piston packing ring comprising a split member that is substantially L-shaped in cross section. having a longitudinal body portion and an outstanding transverse flange portion the thickness of the ring, said body portion having at its free end an outwardly tapered offset flange, forming an inwardly tapered groove having a flat bottom, and a second member substantially Z-shaped in cross section, and having a lower flange the thickness of the ring and extending alongside the free end of the body and the tapered flange of the first member, the body and upper flange of said second member fitting in the tapered groove of the first member and said upper flange having its outer or free end substantially flush with the outer or free end of the flange of the L-shaped member.

In testimony whereof I have affixed my signature.

ALFRED BERGERON.